United States Patent [19]

Rosquist

[11] Patent Number: 4,713,851
[45] Date of Patent: Dec. 22, 1987

[54] BED OR BUNK TORSION SPRING SUSPENSION SYSTEM

[76] Inventor: Von D. Rosquist, P.O. Box 161, LeVan, Utah 84639

[21] Appl. No.: 737,395

[22] Filed: Jul. 2, 1985

[51] Int. Cl.$^4$ .................. A47C 19/16; B63B 29/10; B60J 1/00; F16F 3/00
[52] U.S. Cl. .................................. 5/118; 5/104; 5/210; 114/191; 114/192; 296/190; 267/103; 267/160
[58] Field of Search ............... 5/118, 101, 103, 104, 5/124, 125, 126, 210, 211; 296/190; 114/188, 189, 192, 195, 191; 267/160, 164, 103, 107, 108, 109, 112

[56] References Cited

U.S. PATENT DOCUMENTS

| | | | |
|---|---|---|---|
| 197,886 | 12/1877 | Parks | 114/197 |
| 302,571 | 7/1884 | LeBacq | 114/192 |
| 399,902 | 3/1889 | Jeffery | 5/211 |
| 454,276 | 6/1891 | Jorgensen | 5/103 |
| 509,848 | 11/1893 | Hannahs | 5/103 |
| 704,878 | 7/1902 | Hitt | 114/192 |
| 725,030 | 4/1903 | Brand | 5/210 |
| 801,933 | 10/1905 | Thompson | 5/210 |
| 1,198,084 | 9/1916 | Tappan | 5/118 |
| 1,260,075 | 3/1918 | Shaw | 5/104 |
| 3,067,437 | 12/1962 | Campbell | 5/118 |
| 3,141,178 | 7/1964 | Campbell | 296/24 R |
| 3,285,652 | 11/1966 | Coup | 5/118 |
| 3,524,673 | 8/1970 | Cramer et al. | 5/118 |
| 3,698,022 | 10/1972 | Knight | 5/118 |
| 3,760,436 | 9/1973 | Zach et al. | 5/103 |
| 3,882,558 | 5/1975 | Christensen | 5/118 |
| 3,902,205 | 9/1975 | Bell | 296/24 R |
| 4,087,069 | 5/1978 | Hall et al. | 5/118 |
| 4,107,797 | 8/1978 | Maxwell, Sr. | 296/24 R |
| 4,144,601 | 3/1979 | Anderson et al. | 114/192 |
| 4,196,483 | 4/1980 | Lefler et al. | 5/103 |

FOREIGN PATENT DOCUMENTS

| | | | |
|---|---|---|---|
| 23296 | 6/1882 | Fed. Rep. of Germany | 267/103 |
| 36882 | 2/1912 | Sweden | 5/103 |
| 19965 | of 1907 | United Kingdom | 5/103 |
| 22492 | 10/1908 | United Kingdom | 5/103 |
| 20149 | 9/1914 | United Kingdom | 114/188 |

Primary Examiner—Alexander Grosz
Assistant Examiner—Carl M. DeFranco, Jr.
Attorney, Agent, or Firm—Thorpe, North & Western

[57] ABSTRACT

A suspension system for a bed or bunk which is to rest on a substantially horizontally oriented deck and is particularly adapted for the sleeper compartments of large truck cabs and which substantially reduce the amplitude of vibrations and other disruptive movements of the truck. The system includes a lower support frame which is adapted to be on the deck. An upper support frame for supporting a mattress is positioned above the lower support frame. The two frames are interconnected by at least two torsion spring members wherein the upper support frame is free to move up and down relative to the lower support frame under the influence of the spring action of the torsion spring members. The spring action dampens the transmission of up and down movements from the truck to the upper support frame and the mattress positioned thereon.

6 Claims, 6 Drawing Figures

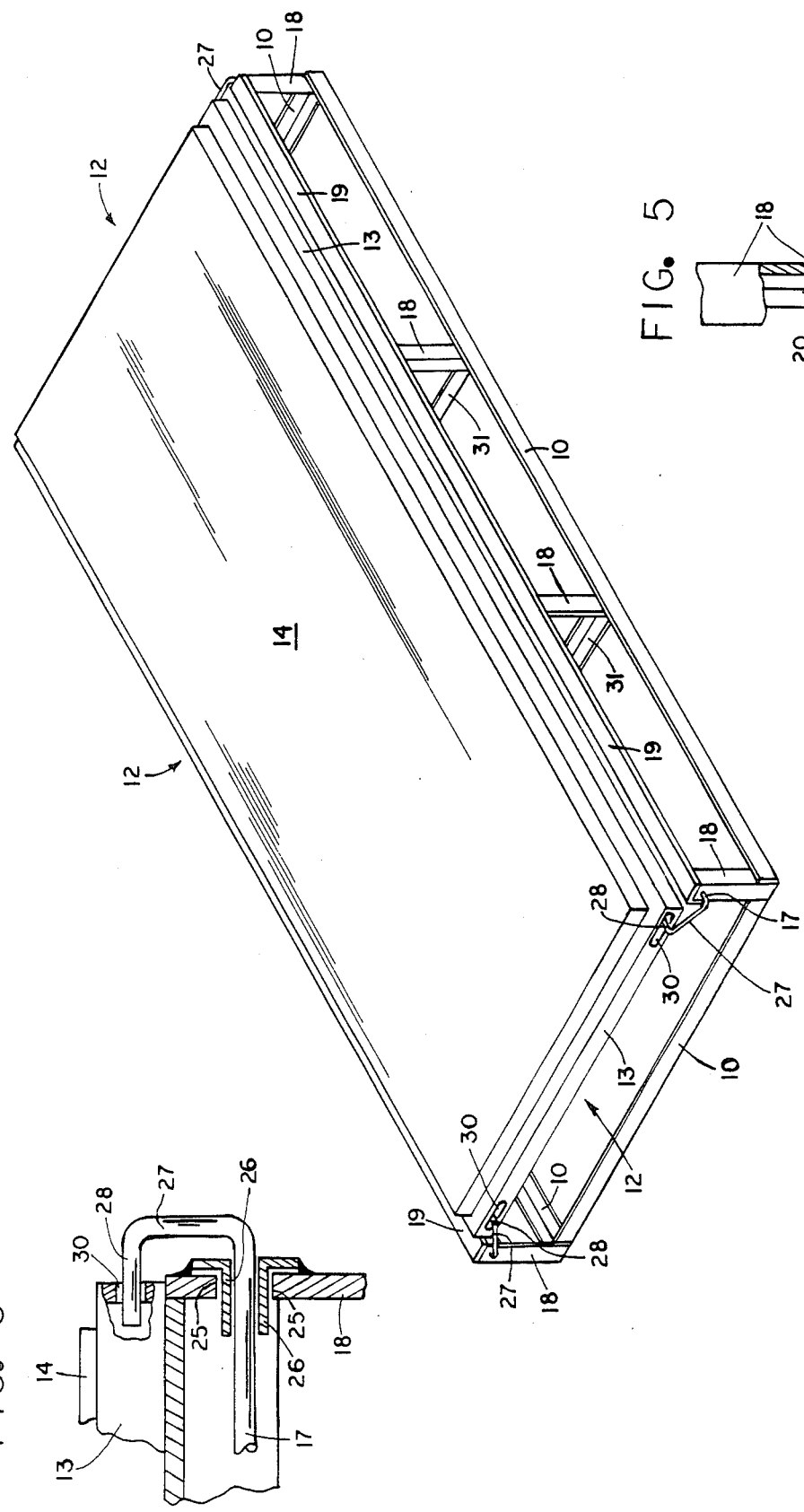
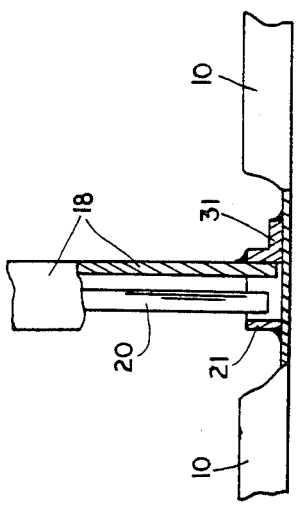

BED OR BUNK TORSION SPRING SUSPENSION SYSTEM

BACKGROUND OF THE INVENTION

1. Field

This invention relates broadly to bed construction and in particular to spring suspension systems and supports for beds or bunks which are used in the sleeping compartments of the cabs of large, diesel powered trucks.

2. State of the Art

Most large, diesel powered trucks used in interstate or long distance hauling are provided with a sleeping compartment or berth. It has become common in long distance operations to provide two drivers who alternate between sleeping and driving. It is desirable that the non-driving member of the driving team can obtain restful sleep while the other member does the driving and vice versa.

To provide restful sleep while the truck is in operation, various systems have been proposed to insulate the mattress of the bunk and the person lying on the mattress from sleep disrupting movements of the truck. Various systems have been proposed in the past to accomplish this purpose. In U.S. Pat. No. 4,107,797 (Maxwell) issued on Aug. 22, 1978, a system was disclosed which utilized a lower frame, an intermediate frame and an upper frame. A set of rollers are provided for limited fore-and-aft movement of the intermediate frame with respect to the lower frame, and a system of springs dampens the fore-and-aft movement. A hydraulic dampening system is also provided between the upper and intermediate frames and serves to dampen the up and down movement of the upper frame relative to the intermediate frame.

In. U.S. Pat. No. 3,760,436 (Zach) issued on Sept. 25, 1973, a mattress suspension system is disclosed which includes a horizontal mattress tray which is coupled to a support system by a group of vertically oriented straps. The straps allow the mattress tray to swing in a fore-and-aft direction. The support system itself comprises a scissor linkage which is biased by an air spring to dampen the up and down movement of the truck cab relative to the mattress tray.

The suspension systems proposed in the above-mentioned patents are bulky, complicated and costly. A number of other suspension systems which are highly complicated mechanically are disclosed in U.S. Pat. Nos. 3,882,558 (Christensen), 3,371,359 (Dome), 3,299,447 (Dome) and 3,067,437 (Campbell).

Other less relevant prior art includes U.S. Pat. Nos. 3,698,022 (Knight) and 3,902,205 (Bell).

3. Objectives

A principal objective of the present invention is to provide a generally inexpensive bed or bunk to be used in the sleeper compartments of large, diesel powered trucks.

Another objective is to provide an improved mattress suspension system which substantially reduces vibration and other disruptive movements of the truck, and wherein the mattress suspension system is built into a bed or bunk which is quickly and easily installed within and removed from the sleeper compartment of a large, diesel powered truck.

A further objective is to provide a bed or bunk having an improved mattress suspension system and which is simple and inexpensive in its construction and inherently durable and reliable.

SUMMARY OF THE INVENTION

The above objectives are achieved in accordance with the present invention by providing an improved bed or bunk for use in the sleeper compartment of a truck. The bed or bunk includes a novel mattress suspension system which provides a generally smooth and restful ride for a person lying upon the mattress while the truck is in motion regardless of motion, vibration or jolting of the truck cab.

The bed or bunk of the present invention comprises a lower support frame which is adapted to maintain a mattress supported thereon in a substantially horizontal position in the sleeper compartment of the truck cab. Means are provided at each of two opposite sides of the lower frame for mounting mutually respective first and second pairs of torsion bars along opposite respective sides of the frame, such that two torsion bars of one pair are mounted along one side of the lower frame and two torsion bars of the second pair are mounted along the opposite side of the lower frame.

An upper, mattress support frame is positioned above the lower support frame and the pairs of torsion bars are connected to the mattress, support frame so as to support the mattress, support frame in its proper position. The torsion arms provide spring action which dampens the up and down motions between the lower frame and the mattress, support frame.

The bed or bunk apparatus of the present invention is simple in both construction and operation. It is inherently rugged and durable. The bed or bunk takes up minimal vertical space within the sleeper compartment, and a person lying upon a mattress supported on the apparatus will experience a restful, generally smooth ride regardless of the motion or jolting of the truck cab. In addition to dampening up and down motions, the torsion spring suspension system reduces excessive sway or fore-and-aft movement as the truck starts, stops or otherwise changes its speed.

Additional objects and features of the present invention will become apparent from the following detailed description, taken together with the accompanying drawings.

THE DRAWINGS

A preferred embodiment of the present invention representing the best mode presently comtemplated of carrying out the invention are illustrated in the accompanying drawings, in which:

FIG. 1 is a pictorial view of a bed or bunk of the present invention as adapted to be positioned within the sleeper compartment of a large, diesel powered truck;

FIG. 5 is a partial vertical elevation of a support strut on the side of the lower frame, with portions of the strut and the lower frame broken away to show the engagement of the end of a torsion bar and the strut; and FIG. 6 is a partial section taken through the corner of the upper end of the lower support frame, showing a bushing through which the torsion bar passes.

DETAILED DESCRIPTION OF THE ILLUSTRATED EMBODIMENT

Figure 2:
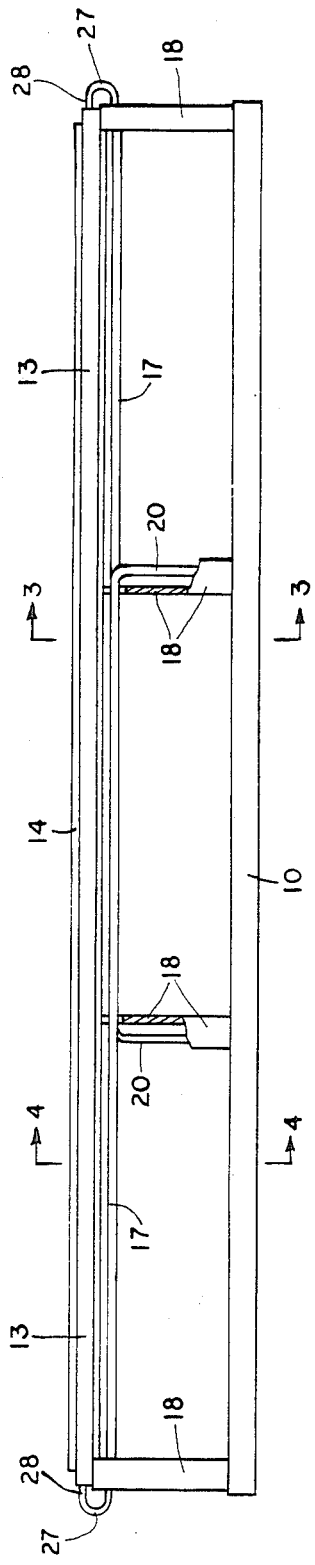
FIG. 2 is a side elevation of the bed or bunk of FIG. 1, with portions of the lower support frame broken away to better show the arrangement of the pair of torsion bars along the side of the lower support frame.

A preferred embodiment of the apparatus of the present invention is shown in the drawings. The apparatus comprises a lower support frame 10. The support frame 10, as illustrated is formed from four elongage pieces of angle iron which have been welded together in substantially rectangular configuration. The lower support frame 10 is substantially flat at least on its lower surface such that the frame 10 can lie flat on the deck of a sleeper compartment of a truck or upon any other flat floor surface.

An upper, mattress support frame 12 is formed from four pieces of angle iron 13 which are welded together in substantially rectangular configuration. In the illustrated embodiment, the upper frame 12 is slightly smaller in width and length than the lower frame 10, such that the upper frame 12 could be nested if so lowered into the lower frame 10. A planar member such as a rectangular piece of plywood 14 is attached to the upper frame 12 so as to form a platform upon which a mattress can be placed. Any appropriate surface can be provided for receiving the mattress in place of the piece of plywood as will be recognized by those skilled in the art. For examaple, fabric or metal straps could be woven between the perimeter of the frame members 13 to form an appropriate mattress receiving surface.

The upper, mattress support frame 12 is positioned above the lower support frame 10 by torsion spring means which allow the upper frame 12 to move up and down relative to the lower frame 10. The torsion spring means provides a spring action which dampens the up and down motion and effectively isolates the upper frame from the disrupting up and down movements of the truck cab. The torsion spring means comprise first and second pairs of torsion bars 17. The first set of torsion bars 17 are positioned along one side of the lower frame 10, and the second set of torsion bars 17 are positioned along the opposite side of the lower frame 10 from the first set.

Means are provided for mounting the two sets of torsion bars 17 to the respective opposite sides of the lower frame 10. As illustrated in the drawings, side mounting members are provided at each of the longitudinal opposite sides of the lower frame 10. Each of the side mouting members comprise four upright angle iron members 18 and a top rail 19. The top rail 19 is an elongate angle iron which extends the length of the respective side of the lower frame 10 and is firmly attached, as by welding, to the spaced upright members 18.

The two respective torsion bars 17 associated with each of the mounting members are adapted to lie along the longitudinal length of the top rail 19 of the respective mounting member. In the embodiment as illustrated, the two torsion bars 17 in each set thereof extend from the central portion of their respective top rail 19 to and slightly beyond the opposite ends of the top rail 19. Along the central portion of the top rail 19, i.e., between the inner two upright members 18, the two torsion bars 17 of each set lie side-by-side of each other. The first torsion bar 17 of each set extends from one of the inner upright members 18 past the second upright member 18 and extends slightly beyond the end of the top rail 19. The second torsion bar 17 of each set extends from the second upright member 18 past the first upright member 18 and extends slightly beyond the other end of the top rail 19. Thus, the two torsion bars 17 are adapted to extend slightly from the opposite ends of the top rail 19.

Figure 4:
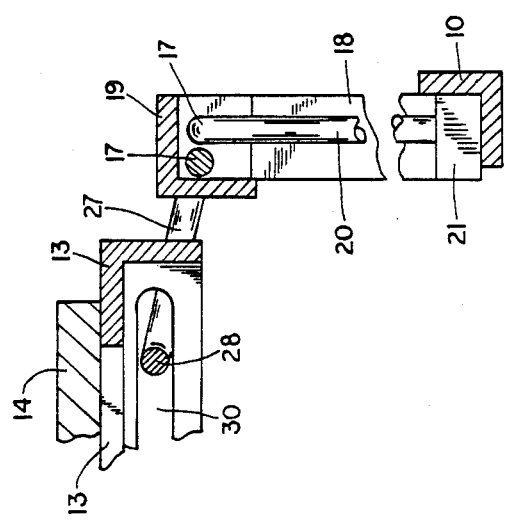
FIG. 4 is a partial vertical section similar to that of FIG. 3 but taken along line 4—4 of FIG. 2.
Figure 3:
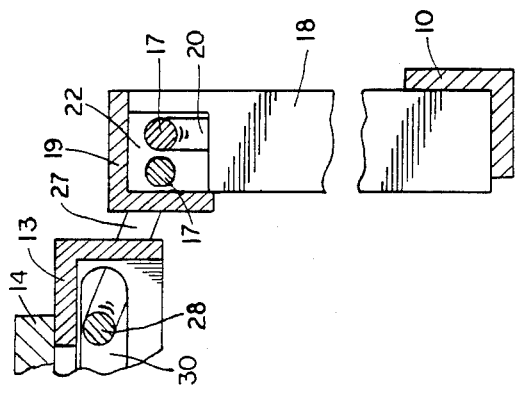
FIG. 3 is a partial vertical section of the bed or bunk of FIGS. 1 and 2 taken along line 3—3 of FIG. 2.

The inner ends of the torsion bars 17 are connected to the mounting members so that the desired torque can be developed in the torsion bars 17. As illustrated, the inner ends of the torsion bars are bent so as to form relatively short legs 20 which extend downwardly along their mutually respective upright members 18. A bushing or keeper 21 is attached at the foot of each of the inner upright members 18, and the free ends of the respective legs 20 of the torsion bars 17 are received within the bushings or keepers 21. The bushings or keepers 21 prevent rotational movement of the legs 20 of the torsion bars and otherwise hold the inner ends of the torsion arms 17 in their proper position. As best shown in FIGS. 3 and 4, the upper web of the upright members 18 are cut out so as to form an opening 22 through which the two respective torsion bars 17 pass unrestricted at least with respect to torsional movement about their respective longitudinal axes.

Openings 25 in the outer upright members 18, i.e., the upright members 18 at the opposite ends of the top rails 19, are provided as shown in FIG. 6, to allow the mutually respective outer ends of the torsion bars 17 to extend from the mounting members. Preferably, a bushing 26 is positioned within each of the openings 25. The outer ends of the torsion bars 17 pass through the bushings so as to eliminate frictional wear on the upright members 18.

The outer ends of the torsion bars 17 are bent into a generally U-shape, comprising an extension 27 which extends generally perpendicular to the longitudinal axis of its mutually respective torsion bar 17. The extensions 27 are further oriented so as to extend inwardly towards the center axis of the bed and slightly upwardly above the elevation of the torsion arms 17. Bent back hook end 28 are formed at the very ends of the torsion bars 17 such that the hook ends 28 extends inwardly a relatively short distance in a direction substantially parallel with the longitudinal length of the mutually respective torsion bars 17.

The upper, mattress support frame 12 is positioned above the lower support frame 10, and the pairs of torsion bars 17 are connected to the upper, mattress support frame 12 so as to support the upper, mattress support frame 12 in its proper position. In the illustrated embodiment, the angle irons 13 which form the opposite longitudinal ends of the upper frame 12 have elongate slots 30. The slots are adapted to receive the respective hook ends 28 of the torsion bars 17. The hook ends 28 move back and forth within the slots 30 as the upper frame 12 moves up and down relative to the lower frame 10.

In operation, the torsion arms provide spring action which dampens the up and down movement of the upper, mattress support frame 12. A mattress is placed on the upper frame 12, and the person desiring to rest and/or sleep lies down on the mattress. The spring action of the torsion bars 17 insulates the person who is lying on the mattress from jolts and other disruptive motions of the truck. The slots 30 can be so positioned that upon fore-and-aft movement of the upper frame 12, the inner portion of the slots 30 engage the hook ends of the torsion bars 17 so that such fore-and-aft movement is also dampened by the torsion spring action.

To strengthen the lower frame 10 and provide adequate support for the force exerted on the lower frame 10 by the legs 20 of the torsion bars 17, cross braces 31 can be provided. The cross braces 31 comprise angle iron members which extend across the lower frame 10 between mutual pairs of upright angle members 18.

While the preferred embodiment of the bed or bunk of the present invention has been described as having mounting members at the opposite longitudinal sides of the lower frame 10 for mounting the two sets of torsion bars 17, it is to be recognized that the suspension system could be designed without providing the specific mounting members shown in the drawings. For example, the extensions 27 of the torsion bars 17 could be somewhat longer, and the torsion bars could then be mounted along the longitudinal sides of the lower frame 10. The torsion bars 17 would then pass through openings in the corners of the lower frame 10, and the extension 27 would extend sufficiently so that the upper frame 12 would occupy the same relative position with respect to the lower frame 10 as in the embodiment shown in the drawings. Further, although not believed to be necessary, a roller bearing or bushing could be provided on the hook ends 28 of the torsion bars 17 to reduce friction and/or noise between the ends 28 and the upper frame 12.

It is to be understood that the present disclosure, including the detailed description of a particular, preferred embodiment, is made by way of example. Various other embodiments are possible without departing from the subject matter coming within the scope of the following claims, which subject matter is regarded as the invention.

I claim:

1. A suspension system for a bed or bunk which is adapted to maintain a mattress supported thereon in a substantially horizontal orientation, said suspension system comprising:

a lower support frame which is adapted to lie in a substantially horizontal position;

an upper mattress support frame having a substantially rigid skeletal structure comprising opposed, substantially parallel sides and opposite ends interconnected between said opposed sides, said upper frame being adapted to be positioned above the lower support frame;

at least two elongated torsion spring members each including first and second ends and a torsion element connecting said first end to said second end;

means for mounting at least one of said torsion springs adjacent each of said sides and intermediate said upper support frame and said lower support frame such that said upper mattress support frame is supported above said lower support frame by said torsion springs, said mounting means comprising attachments for securing said first end of said torsion springs firmly to the corresponding sides of said lower frame such that each of said first ends is restrained from rotational movement about the longitudinal axis thereof, said mounting means further comprising connecting means which operably connect said second ends of said torsion spring members to the corresponding ends of said upper frame, with said connecting means being integrally attached to said mutually respective second ends of said torsion spring members and said second ends extending from said torsion elements of said torsion spring members at an angle from the longitudinal axis of said torsion spring members, said mounting means additionally comprising a lost motion means operably associated with said upper support frame for permitting substantially only vertical displacement of said upper support frame under the influence of the spring action of the torsion spring members whereby the torsion spring members dampen the vertical displacement between said upper support frame and said lower support frame, said lost motion means being formed in said ends of said upper support frame; and said torsion element of said torsion springs extending generally parallel to the corresponding sides of said upper support frame and removed from the outer periphery of said upper support frame.

2. A suspension system in accordance with claim 1, wherein the torsion spring members comprise first and second pairs of torsion bars, and the means for mounting the torsion members between the lower and upper frames comprises means for attaching said first ends of said torsion bars firmly to the lower frame such that said first ends are restrained from rotational movement about the longitudinal axis of said torsion bars and with the torsion bars further being oriented so as to extend generally parallel with each other and the opposed sides of the upper frame, and further with said second ends of said first and second pairs of torsion bars being connected to opposite ends of the upper frame by means of tongue arms or extensions comprising end portions of the torsion bars which have been bent at an angle from the longitudinal axes of said torsion bars.

3. A suspension system in accordance with claim 2, wherein said second end of said torsion bars further contain a hook end comprising the free end portions of said tongue arms or extension which have been bent at an angle, and wherein said lost motion means includes openings provided in opposite ends of the upper support frame which are adapted to receive the hook ends of said second ends of said torsion bars.

4. A suspension system in accordance with claim 3, wherein the means for attaching said first ends of said torsion bars to the lower frame comprises:

a plurality of upright members spaced along each of opposite sides of said lower frame and a pair of top rails attached to the otherwise free ends of said upright members at mutually respective opposite sides of said lower frame;

openings in each of the upright members which are next to the corners of the lower frame; and bent legs at said first ends of said torsion bars;

whereby said second ends of said torsion bars are journaled through said respective openings in said upright members, said torsional elements of said torsion bars lie along and adjacent to the repective top rails, and the bent legs at said first ends of said torsion bars are engaged with respective upright members spaced inwardly along the sides of said lower frame from the uprights which are next to the corners of the lower frame such that said bent ends are restrained from rotational movement about the axes corresponding to the respective longitudinal lengths of said torsion bars.

5. A suspension system in accordance with claim 4, wherein bushing members are provided in the openings in said upright members, and the torsion bars are journaled through said bushing members.

6. A suspension system in accordance with claim 4, wherein cross braces are provided which extend across the lower frame between mutual pairs of the inwardly spaced upright members.

* * * * *